(12) United States Patent
Christ et al.

(10) Patent No.: US 10,513,149 B2
(45) Date of Patent: Dec. 24, 2019

(54) AXLE UNIT

(71) Applicant: SAF-HOLLAND GmbH, Bessenbach (DE)

(72) Inventors: Armin Christ, Bessenbach (DE); Florian Borde, Biebergemünd (DE)

(73) Assignee: SAF-HOLLAND GmbH, Bessenbach (DE)

( * ) Notice: Subject to any disclaimer, the term of this patent is extended or adjusted under 35 U.S.C. 154(b) by 183 days.

(21) Appl. No.: 15/510,099

(22) PCT Filed: Sep. 7, 2015

(86) PCT No.: PCT/EP2015/070376
§ 371 (c)(1),
(2) Date: Mar. 9, 2017

(87) PCT Pub. No.: WO2016/037976
PCT Pub. Date: Mar. 17, 2016

(65) Prior Publication Data
US 2017/0259619 A1    Sep. 14, 2017

(30) Foreign Application Priority Data

Sep. 12, 2014  (DE) .................... 10 2014 218 332

(51) Int. Cl.
*B60B 35/08*  (2006.01)
*B60B 35/04*  (2006.01)

(52) U.S. Cl.
CPC .............. *B60B 35/08* (2013.01); *B60B 35/04* (2013.01); *B60B 2310/302* (2013.01);
(Continued)

(58) Field of Classification Search
CPC ................................ B60B 35/04; B60B 35/08
See application file for complete search history.

(56) References Cited

U.S. PATENT DOCUMENTS 1,965,267 A   7/1934  Storer
3,792,434 A   2/1974  Williams
(Continued)

FOREIGN PATENT DOCUMENTS

CA        2200647        3/1997
CN     203511165 U  *  4/2014
(Continued)

OTHER PUBLICATIONS

European Patent Office; International Search Report, dated Nov. 2, 2015.

*Primary Examiner* — Kip T Kotter
(74) *Attorney, Agent, or Firm* — Price Heneveld LLP (57) ABSTRACT

The invention concerns an axle unit comprising a stub axle and a tube unit, wherein the stub axle at least in regions is configured rotationally symmetrically about a stub axis and has a channel which extends substantially parallel to the stub axis, wherein the tube unit is configured as a hollow body and extends substantially along a tube axis, wherein the tube unit has a recess running transversely to the tube axis, wherein a line element is provided which can be brought into fluid-tight connection with the channel and passed through the recess of the tube unit. A method for production of an axle unit is also given.

14 Claims, 5 Drawing Sheets

(52) U.S. Cl.
CPC . *B60B 2310/3025* (2013.01); *B60B 2900/111* (2013.01); *B60B 2900/113* (2013.01); *B60B 2900/115* (2013.01)

(56) References Cited

U.S. PATENT DOCUMENTS

| | | | | |
|---|---|---|---|---|
| 5,538,330 | A * | 7/1996 | Ehrlich | B60B 7/002 301/108.1 |
| 6,145,559 | A * | 11/2000 | Ingram, II | B60C 23/003 152/417 |
| 6,435,238 | B1 * | 8/2002 | Hennig | B60C 23/003 152/415 |
| 2004/0155516 | A1 * | 8/2004 | Colussi | B60C 23/003 301/5.24 |
| 2004/0238093 | A1 * | 12/2004 | Nelson | B60C 23/003 152/415 |
| 2005/0206222 | A1 * | 9/2005 | Swanson | B60B 35/121 301/124.1 |
| 2008/0084289 | A1 | 4/2008 | White et al. | |
| 2013/0207450 | A1 * | 8/2013 | Ebert | B60B 35/14 301/132 |
| 2015/0096656 | A1 * | 4/2015 | Polubinski | B60C 23/003 152/419 |

FOREIGN PATENT DOCUMENTS

| | | |
|---|---|---|
| CN | 103889734 | 6/2014 |
| DE | 602006000843 | 5/2009 |
| DE | 102011007231 | 10/2012 |
| EP | 2974892 | 1/2016 |
| WO | 02076771 | 10/2002 |
| WO | 2012015669 | 2/2012 |

* cited by examiner

AXLE UNIT

BACKGROUND OF THE INVENTION

The present invention concerns an axle unit, in particular for use in trucks.

Axle units have been known for a long time in the prior art. It is also known to mount additional motors, such as for example hydraulic single wheel drives, on axle units in the region of the wheel suspension in order for example to be able to maneuver a trailer when the tractor vehicle is detached, or for example to be able to transmit additional drive power to the individual wheels on steep gradients and/or under heavy load. In the past, a great improvement has already been achieved by integrating in the axle body of a rigid axle the lines necessary to supply the additional drive with the corresponding hydraulic fluid. Since, suitably, the hydraulic lines must be conducted to the additional motor via the non-rotating part of a wheel suspension, and—if the hydraulic lines are not integrated in the axle body—this would require an extremely complex line arrangement which is susceptible to failure and takes up substantial installation space, so far axle bodies have been used which are able to receive hydraulic lines. However, these axle bodies have proved extremely disadvantageous since they have an extremely high weight. In addition, creating the bores in the axle body entails a very great production cost. There is therefore a need for improvement with regard to the weight reduction of axle bodies with integrated hydraulic lines, and with regard to simplifying the production of such an axle body.

The object of the present invention is to provide an axle unit which allows a low weight and easier production, while fulfilling the high requirements for strength and durability under load. Furthermore, a production method is indicated for production of an axle unit, which is simpler and more economic to implement than the production methods previously known.

SUMMARY OF THE INVENTION

According to the invention, the axle unit comprises a stub axle and a tube unit, wherein the stub axle at least in regions is configured rotationally symmetrically about a stub axis and has a channel which extends substantially parallel to the stub axis, wherein the tube unit is configured as a hollow body and extends substantially along a tube axis, wherein the tube unit has a recess or bore running transversely to the tube axis, wherein a line element is provided which may be brought into fluid-tight connection with the channel and passed through the recess or bore of the tube unit. The axle unit is preferably a rigid axle for a truck, which is designed to supply an additional motor arranged on the axle unit with the corresponding drive medium via lines arranged inside the axle unit, such as the channel in the stub axle. Here, the stub axle of the axle unit is preferably a solid-bodied axle unit which has a channel through which for example a hydraulic fluid may flow. Preferably, on its outer face, the stub axle is configured rotationally symmetrical to a stub axis, wherein for example the wheel hub of a vehicle wheel can be mounted or preferably is mounted rotatably relative to the stub axle on this outer face. The arrangement of the channel inside the stub axle, such that this extends parallel to the stub axis and hence ends at the respective end faces of the stub axle, is advantageous in that no bores need be made laterally in the stub axle, which would weaken the strength of the stub axle and lead to a high production cost. In this context, preferably, it is possible to avoid having to create a bore laterally in the stub axle which must meet a bore running along the stub axis inside the stub axle. The tube unit is preferably formed as a hollow body, i.e. particularly preferably formed as a hollow cylinder. In a particularly preferred embodiment, the tube unit is composed of several hollow-bodied segments which may be or preferably are connected together. The tube unit extends preferably substantially along a tube axis and is particularly preferably configured, at least in regions, rotationally symmetrically about the tube axis. Furthermore, the tube unit has a recess or bore which is made transversely to the tube axis, or particularly preferably perpendicularly to the tube axis, in a wall of the tube unit. The recess or bore serves in particular to be able to guide out of the tube unit the line element which may be or preferably is secured to the end face of the stub axle pointing towards the tube unit. For this, preferably, the recess or bore is configured such that during installation of the axle unit, the line element may be pushed from the inside of the tube unit through the recess or bore towards the outside. The line element is particularly preferably a hydraulic line, for example a high-pressure hose, which is primarily designed to withstand high pressures of a hydraulic fluid and still have a certain flexibility, so that the axle unit may be installed simply and in particular the line element passed easily through the bore of the tube unit. Preferably, in the assembled state of the axle unit, the line element is in fluid-conductive connection with the channel of the stub axle, and is conducted towards the outside through the recess or bore of the tube unit in order, with its end facing away from the stub axle, to be coupled to a hydraulic system. The combination of a stub axle formed as a solid body and a tube unit formed as a hollow body, in comparison with solutions known from the prior art, allows a significant reduction in the weight of the axle unit, since in particular the hollow-bodied region of the axle unit allows a substantially lower weight of the axle unit with approximately the same resistance to bending and torsion. At the same time, by simple installation and simple connection of a line element to the channel of the stub axle, in a simple fashion hydraulic fluid may be conducted to an additional drive which may be attached to the axle unit.

Advantageously, the stub axle has a stub length along the stub axis, wherein the tube unit has a tube length along the tube axis, and wherein the ratio of the stub length to the tube length is 0.1 to 1.2, preferably 0.2 to 1, and particularly preferably approximately 0.4 to 0.7. It has been found that the weight of the axle unit can be reduced in particular if the ratio of the stub length to the tube length is held at approximately 0.1 to 1.2. At the same time, this ratio allows room for all necessary systems such as wheel suspension, brake carriers and control arm suspension on the stub axle or in the transitional region between the stub axle and the tube unit. Experiments by the applicant have shown that, with a ratio of stub length to tube length of 0.2 to 1, in particular for the track widths currently demanded by manufacturers for trucks, particularly good weight values can be achieved using standard semi-finished products for the manufacture of the stub axle. It has proved advantageous here that, as far as possible, both stub axles designed for mounting of an additional drive and stub axles designed for rigid truck axles without additional drive, and hence without hydraulic line systems, may be produced from one and the same type of semi-finished product or stub axle blank. The preferred ratio of stub length to tube length of 0.2 to 1, according to simulations by the applicant, in particular for these requirements, allowed particularly low values for the weight of the entire axle unit. For particularly heavily loaded trucks, it has proved advantageous to keep the ratio of stub length to tube length in a ratio of 0.4 to 0.7, wherein in particular the minimum value of 0.4 of the ratio of stub length to tube length provides a relatively long stub axle in comparison with the tube unit. This is because for heavily loaded trucks, such as for example heavy-duty trailers, the axle units must be as compact as possible, in which the stub length should be no less than 0.4 times the tube length. In order to be able to save weight in these vehicles too, it has proved advantageous if the maximum value of the stub length relative to the tube length does not lie above 0.7 of the mutual ratio of the two lengths, since in this way the hollow-bodied proportion of the axle unit is kept relatively high.

Advantageously, the tube unit has a first joining region which is preferably configured for creating an advantageously substance-bonded connection to the stub axle. The tube unit preferably has a joining region, preferably with a rebate, in which the stub axle may be inserted at least in regions and on which the stub axle advantageously stops in the fully inserted state. In particular, preferably, the joining region of the tube unit is a cylindrical inner face of the tube unit which has a greater diameter than the inner face of the tube unit arranged next to the joining region. Preferably, for the creation of a weld connection using for example a thermal welding process, the first joining region has a chamfer which cooperates with a corresponding chamfer on the stub axle to facilitate insertion of a weld material for creation of a weld connection. Alternatively, preferably the first joining region may also comprise capillary channels which are configured in particular for conducting a molten filler metal along the first joining region into an intermediate region between the tube unit and the stub axle, in order in this way to create a particularly strong weld connection.

Preferably, the first joining region forms an overlap with a stub joining region, wherein the overlap has an overlap length which stands in a ratio of 0.05 to 0.4, preferably 0.1 to 0.3 and particularly preferably approximately 0.15 to 0.20 to the stub length. The overlap between the first joining region and the stub joining region preferably facilitates mounting of the axle unit, since the stub axle with its stub joining region may preferably be pushed into the first joining region of the tube unit, and thus secured at least against displacement relative to the tube unit transversely to the tube axis. Then a weld seam may be produced between the stub axle and the tube unit, wherein the overlap length guarantees in particular a lever arm for absorbing bending moments occurring between the stub axle and the tube unit. It has been found that the requirements for the bending moments to be absorbed by the connection between the stub axle and the tube unit can be fulfilled with an axle unit in particular if the ratio of the overlap length to the stub length is kept in a range from 0.05 to 0.4. In the context of the present invention, the particularly preferred ratio of 0.1 to 0.3 allows in particular the saving of weight, since the ratio of the overlap length to the stub length is selected no greater than 0.3 and at the same time, however, with a value of 0.1, a sufficient overlap is guaranteed in order to create a firm connection between the first joining region and the stub joining region. For the above-mentioned heavy duty trucks under high load, a range of 0.15 to 0.2 has proved suitable which firstly guarantees a high strength and secondly, with a compact construction of both the tube unit itself and of the connecting region between the stub axle and tube unit, allows a good compromise between weight saving and the transmission of particularly high forces and bending moments.

Furthermore, preferably, a gap is provided in the region of the overlap of the first joining region to the stub joining region, which gap is suitable for introduction of an adhesive. Suitable adhesives in the context of the present invention are in particular a filler metal or a glue. The gap between the first joining region and the stub joining region also facilitates mounting of the axle unit, since the stub axle and the tube unit can be pushed together without great use of force, and wherein then a corresponding adhesive may be introduced into the gap to allow a particularly firm substance-bonded connection, which also covers a particularly large area depending on the overlap length between the stub axle and the tube unit. Use of an adhesive is here particularly preferred since different production materials of the stub axle and tube unit can in this way be connected together by substance bonding, and hence for the connecting region, the highest values for connection strength can be achieved. A glue is preferred if a substance-bonded connection is to be produced with as little cost as possible and without requiring heating.

Advantageously, the stub axle has a connecting portion with engagement means for creating a fluid-tight connection between the line element and the channel. Such engagement means of the connecting portion may for example be a thread or a bayonet lock, which allow a suitably releasable form-fit and/or force-fit connection between the connecting portion arranged on the stub axle and a corresponding engagement geometry of the line element. A form-fit engagement is advantageous since it can be released again without damaging the material. Alternatively, preferably, in order to ensure that the service life of the connection between the line element and channel is as long as possible, alternatively or additionally to the form-fit engagement, a substance-bonded engagement may be provided. Above all, the use of a glue is recommended here which, particularly preferably, can connect together by substance bonding different manufacturing materials of the stub axle and the corresponding engagement geometry of the line element. By creating a substance-bonded connection between the line element and the connecting portion on the stub axle, preferably a maintenance-free interface between the stub axle and the line element can be produced.

In a particularly preferred embodiment, the stub axle and the tube unit are connected together by substance bonding by means of a thermal welding process. In this context, a thermal welding process is preferably inert gas welding, such as for example metal inert gas welding. Depending on the production materials of the stub axle and tube unit to be welded, in the context of the present invention however, a plurality of different thermal welding methods may be used. The thermal welding method is suitable in particular since the addition of heat to the connecting region between the stub axle and the tube unit can be controlled extremely well, and hence damage to the stub axle, the channel arranged in the stub axle and the connecting portion (preferably provided) can be avoided. In addition, in the event of maintenance, it is easier to separate the connection between the stub axle and the tube unit than would be the case for example if the stub axle and tube unit were connected together by means of a friction-welding method. Only if the requirements for strength of the connection between the stub axle and tube unit are more important than the possibility of being able to separate this connection again, and more important than the risk to the channel and connecting portion of the stub axle from the high heat application from friction welding, may the use of a rotational friction-welding method be preferred for connecting the tube unit and the stub axle, in order to achieve higher connection strengths.

In a further preferred embodiment, the tube unit has a material reinforcement in the region of the recess, wherein the material reinforcement preferably has a first wall thickness which stands in a ratio of 1.05 to 3, preferably 1.3 to 2.6, and particularly preferably approximately 1.5 to 1.8 to a mean tube wall thickness. The material reinforcement here serves firstly to compensate for the material weakness produced by creation of the recess or bore, and secondly at the same time as a stop for the stub axle, which is pushed with its stub joining region into the first joining region. The material reinforcement is preferably arranged near, or particularly preferably directly adjacent to the first joining region. The material reinforcement has a first wall thickness which advantageously is measured transversely or preferably perpendicularly to the tube axis. The mean tube wall thickness is preferably the mean value of wall thicknesses which may vary under circumstances, of the tube unit outside the material reinforcement transversely to the tube axis. Depending on the size and number of the recesses or bores made in the tube unit, and depending on the bending moments to be absorbed, it is preferred that the ratio of the first wall thickness to the mean tube wall thickness lies in a range from 1.05 to 3, since in this way it is guaranteed that the axle unit meets the requirements for bending strength. The ratio range of 1.3 to 2.6 has proved suitable in particular for a number of four recesses or bores which are made in the tube unit, and for this number allows a correspondingly high strength with simultaneously low weight. The ratio range of 1.5 to 1.8 is used in particular for heavy-duty trucks, wherein in particular the upper limit of the ratio range of 1.8 means that the mean tube wall thickness has relatively high values and hence it is not necessary to provide a first wall thickness which is higher by a multiple in the region of the material reinforcement. The lower value of this ratio range of 1.5 is required in particular to provide a corresponding compensation for a notch effect occurring at a bore under high loads.

In a particularly preferred embodiment, the tube unit comprises an axle tube and an intermediate element, wherein the recess or bore, preferably a material reinforcement, and a first joining region are provided on the intermediate element, and wherein the intermediate element has a second joining region for securing to the axle tube. The intermediate element advantageously facilitates mounting of the axle unit, since in a first step the intermediate element and stub axle may be joined together, wherein the connecting portion of the line element on the stub axle still remains accessible and wherein then the semifinished product formed from the stub axle, intermediate element and line element may easily be attached to the axle tube. In particular, the intermediate element is used for preference, since in this way there is no need for the line element to be threaded from the open side of the axle tube or axle unit pointing towards the stub axle into said axle unit and out through the side recesses or bores, while the tube unit and stub axle are being brought together. Advantageously, with the stub axle, line element and intermediate element, firstly the part of the axle unit which has the more complex geometries, such as the connecting portion and recesses or bores, can be pre-produced. In addition, it is also possible to secure the intermediate element to the stub axle by means of a friction-welding process and only then secure the line element to the stub axle through the intermediate element. It is particularly preferred that the extension of the intermediate element along the tube axis or along the stub axis, preferably oriented co-linear to the tube axis, is shorter than the extension of the stub axle. In a particularly preferred embodiment, the intermediate element comprises in this order firstly the first joining region, then adjoining this the material reinforcement, and adjoining this the second joining region.

Particularly preferably, the intermediate element is here formed substantially rotationally symmetrically about the tube axis. The term "substantially rotationally symmetrical" in this context means that minor deviations from rotational symmetry, caused in particular by the recesses or bores in the intermediate element made transversely to the tube axis, may be disregarded in this context. It has been found that rotationally symmetrical cross-sections have the highest strength values against bending stress and at the same time also resist torsion well.

In a particularly preferred embodiment, the stub axle has at least two, preferably at least three and particularly preferably four channels, wherein the number of recesses is preferably equal to the number of channels. To supply a hydraulic additional drive, it is advantageous that the stub axle has at least two channels, wherein one of these channels is configured as a pressure supply line and the other as a return line for the hydraulic fluid. For the drive of more complex additional motors, it may also be preferred to arrange at least three channels in the stub axle, wherein two channels may be used as pressure supply lines and a third channel as a common return line for hydraulic fluid. In a particularly preferred embodiment, a fourth channel is provided through which a heated hydraulic fluid may be conducted into the additional drive, in order to allow or accelerate the reaching of the necessary operating temperature of the hydraulic additional drive at particularly low exterior temperatures. Particularly preferably, the number of recesses or bores is adapted to the number of channels, in order in particular not to have to guide two or more lines through a recess or bore which must be made particularly large, and in this way drastically reduce the strength of the tube unit in this region. Advantageously, the recesses or bores are arranged evenly distributed over the circumference of the tube unit in the region adjacent to the stub axle.

In a preferred embodiment, the axle unit comprises two stub axles and a tube unit, wherein a stub axle may be secured to each side of the tube unit. Preferably, the axle unit is configured as a rigid axle with a hollow-bodied portion, preferably the tube unit, wherein a stub axle is arranged at each end of the tube unit. Particularly preferably, the stub axles are attached to the tube unit by a welding process. Advantageously, the weight of the axle unit is reduced by a high proportion of the tube unit in the entire axle unit, since the tube unit particularly preferably is configured as a hollow body.

Particularly preferably, the tube unit is made at least partially from a different material than the stub axle. It may be desirable for example to make the intermediate element and/or the axle tube preferably from a lighter metal, such as aluminum. In particular if the directions of the bending moments acting on the axle unit are known, preferably a fiber composite material may be used which in certain directions has a higher tensile strength than a simple homogenous material, such as for example a cast steel. Particularly preferably, in this context Glare may be used, which is a fiber-reinforced aluminum material, since this firstly has a low density and secondly a particularly high tensile strength in the longitudinal direction of the embedded fibers.

According to the invention, a method is provided for production of an axle unit, comprising the steps:

provision of a stub axle with a channel, a tube unit and a line element;

securing the line element to a connecting portion of the stub axle in order to create a fluid-tight connection between the line element and the channel;

guiding the line element through a recess or bore on the tube unit;

securing the tube unit to the stub axle.

The proposed method substantially reduces the mounting complexity in comparison with the method known from the prior art for manufacture of an axle unit, in which an additional drive may be supplied with hydraulic fluid via hydraulic lines arranged inside the axle unit. Thus in a first preferred variant of the method, the line element may firstly be secured to the stub axle and then guided through a recess or bore on the tube unit, in order then to secure the stub axle and tube unit to each other. This simple manner of production means that single fitter firstly need handle only the stub axle and line element, and then in a next step arrange the assembly of stub axle and line element on the tube unit and for example weld this firmly in place.

Particularly preferably, a thermal welding process is used to secure the tube unit to the stub axle. In this context, in particular inert gas welding has proved suitable, since firstly it is economic and secondly allows a high-quality weld seam. Furthermore, inert gas welding is also suitable for most metals normally used for production of an axle unit.

Preferably, the tube unit produced using the method comprises an axle tube and an intermediate element, wherein the recess or bore is provided on the intermediate element, wherein firstly the stub axle is secured to the intermediate element, and wherein then the axle tube is secured to the side of the intermediate element opposite the stub axle. To simplify further the production of the axle unit, an intermediate element is provided which may be arranged between an axle tube and the stub axle and which comprises the recess or bore for guiding the line element towards the outside. Advantageously, the fitter may firstly connect together the stub axle, line element and intermediate element, and then secure the assembly of these three components to the axle tube. This method is distinguished in that the fitter may firstly handle only a smaller assembly, for example on a smaller workbench, and only after completion of the production process attach the relatively large axle tube to the assembly of intermediate element, stub axle and line element.

Particularly preferably, after provision of the stub axle, the intermediate element is secured to the stub axle, wherein then the line element is connected to the channel of the stub axle and guided towards the outside through the recess out of the intermediate element, wherein then the axle tube is secured to the intermediate element. In this preferred embodiment, it is possible to secure the intermediate element to the stub axle by means of a rotational friction-welding process, wherein the intermediate element and stub axle are set in rotation relative to each other about the stub axis or about the tube axis, and pressed against each other and welded to each other in a first joining region or in the stub joining region. Only after completion of this method step may the fitter guide the line element through the recess or bore on the intermediate element and secure it to the stub axle. The assembly of stub axle, line element and intermediate element may be attached to the axle tube in a final step of this preferred method.

Preferably, a friction welding process is used to secure the intermediate element to the stub axle. Friction welding in general achieves a larger welding zone between the components to be welded than thermal welding, whereby a firmer connection is created. It is preferred that friction welding is provided in the intermediate region between the intermediate element and the stub axle, and not in the region between the intermediate element and axle tube, since a separation which may be required for maintenance purposes is thus possible more easily in the region between the intermediate element and axle tube than in the region between the intermediate element and stub axle. Preferably, in the event of maintenance, the assembly of stub axle and intermediate element may be jointly separated from the axle tube and raised, since because of the more complex geometry, the stub axle requires a greater production complexity than the axle tube. Thus it is preferred, on dismantling of the axle unit, to retain the stub axle, wherein the region between the intermediate element and axle tube is separated and for example a second joining region produced by means of a material removal process.

Preferably, alternatively or additionally to a weld connection, an adhesive connection is created for securing the stub axle to the tube unit. An adhesive connection is preferred in particular if different materials of the stub axle and tube unit are to be connected together, in which case the adhesive connection preferably replaces a weld connection. Particularly preferably, an overlap region is provided between the stub axle and the tube unit, wherein a first portion of the overlap region may be configured for the creation of an adhesive connection, and a second portion, preferably sufficiently remote from the first overlap portion, serves for production of a weld connection. In this way, the advantages of the different methods for production of a substance-bonded connection may be combined, and hence the costs for production of the axle unit reduced and its quality increased with relatively little effort.

BRIEF DESCRIPTION OF THE DRAWINGS

Further advantages and features of the present invention arise from the description below with reference to the attached figures. It is understood that individual features shown in the individual embodiments may also be preferred in the alternative embodiments, unless this is explicitly excluded or prevented for technical reasons.

The drawings show.

DETAILED DESCRIPTION OF THE PREFERRED EMBODIMENTS

Figure 1:
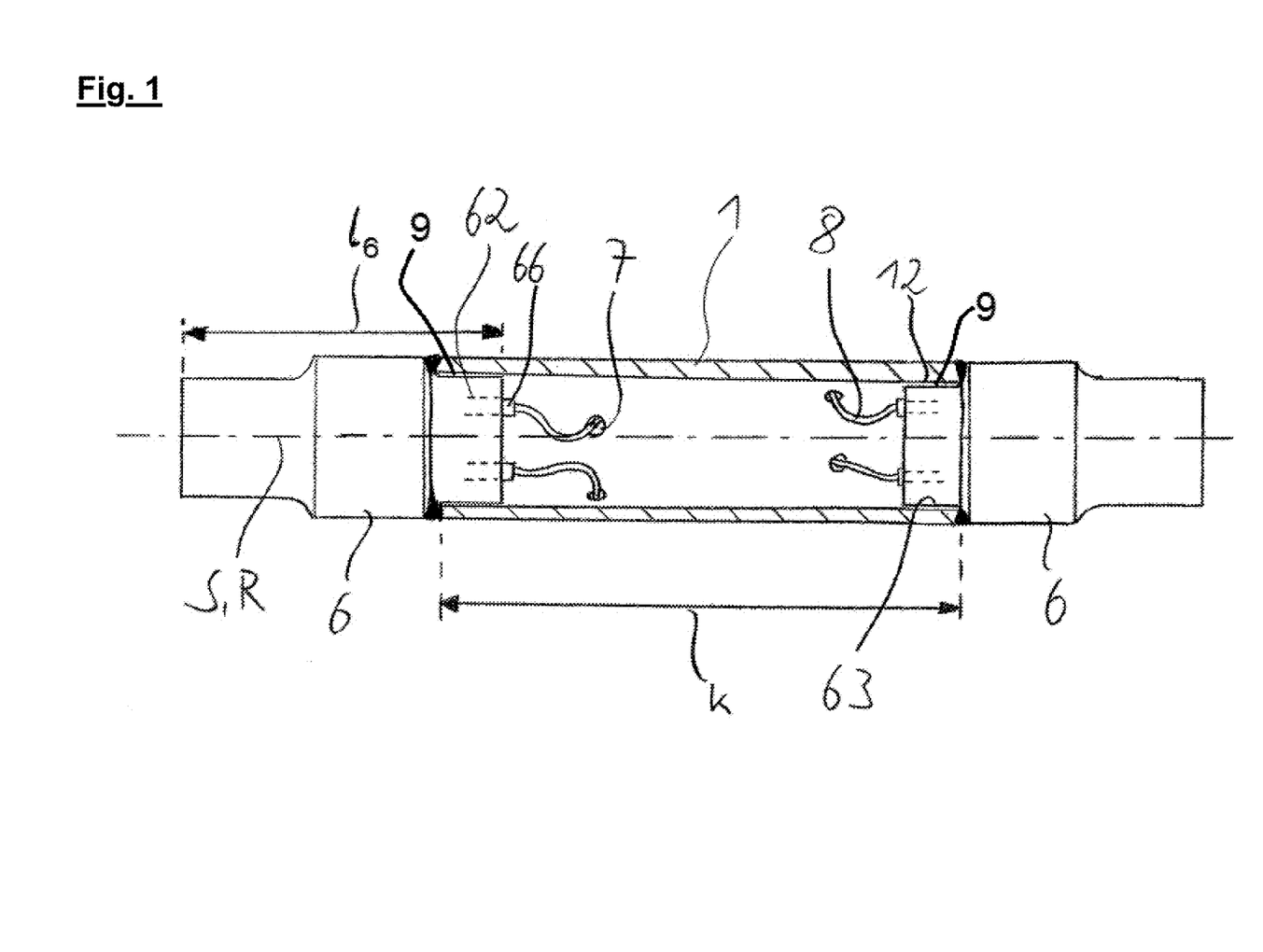
FIG. 1 a partially cutaway view of a preferred embodiment of the axle unit according to the invention.

The preferred embodiment shown in FIG. 1 of the axle unit according to the invention has a tube unit 1 and preferably two stub axles 6 attached to the tube unit. The stub axles 6 are preferably configured identically, wherein in the description below, reference is made to one stub axle 6 only. The stub axle 6 has a stub length I, wherein the stub length I is measured substantially along or parallel to the stub axis S. When the axle unit is in the assembled state, the stub axis S is aligned preferably co-linear to a tube axis R, as shown in the figure. The tube unit 1 extends substantially along the tube axis R and is preferably configured, at least in regions, rotationally symmetrically about the tube axis R. The stub axle 6 preferably has a stub joining region 63 which, at least in portions, is inserted in the first joining region 12 of the tube unit 1. Furthermore, the stub axle 6 preferably has two channels 62, indicated merely diagrammatically in the figure, which extend inside the stub axle 6 along the stub axis S. On the side of the stub axle 6 facing the tube unit 1, each channel 62 has a connecting portion 66 which serves to secure a line element 8. The line element 8 is here connected fluid-tightly to the channel 62. In the figure, four line elements 8 are shown, wherein the reference numeral has been shown for one only. The line elements 8 are each guided out of the tube unit 1 through a respective recess or bore 7 transversely to the tube axis R. By the arrangement of the connecting portion 66 at the end face of the stub axle 6 pointing towards the inside, it is possible to significantly increase its strength since no bores need be made in the stub axle 6 transversely to the stub axis S. Particularly preferably, the tube unit 1 has a tube length k which is measured substantially along or parallel to the tube axis R. Furthermore, it is clear that a gap 9 remains between the stub joining region 63 and the first joining region 12, wherein to support the weld seam (also clearly marked) between the tube unit 1 and the stub axle 6, in addition an adhesive may be provided in this gap 9 which increases the strength of the connection of the stub axle and the tube unit.

Figure 2:
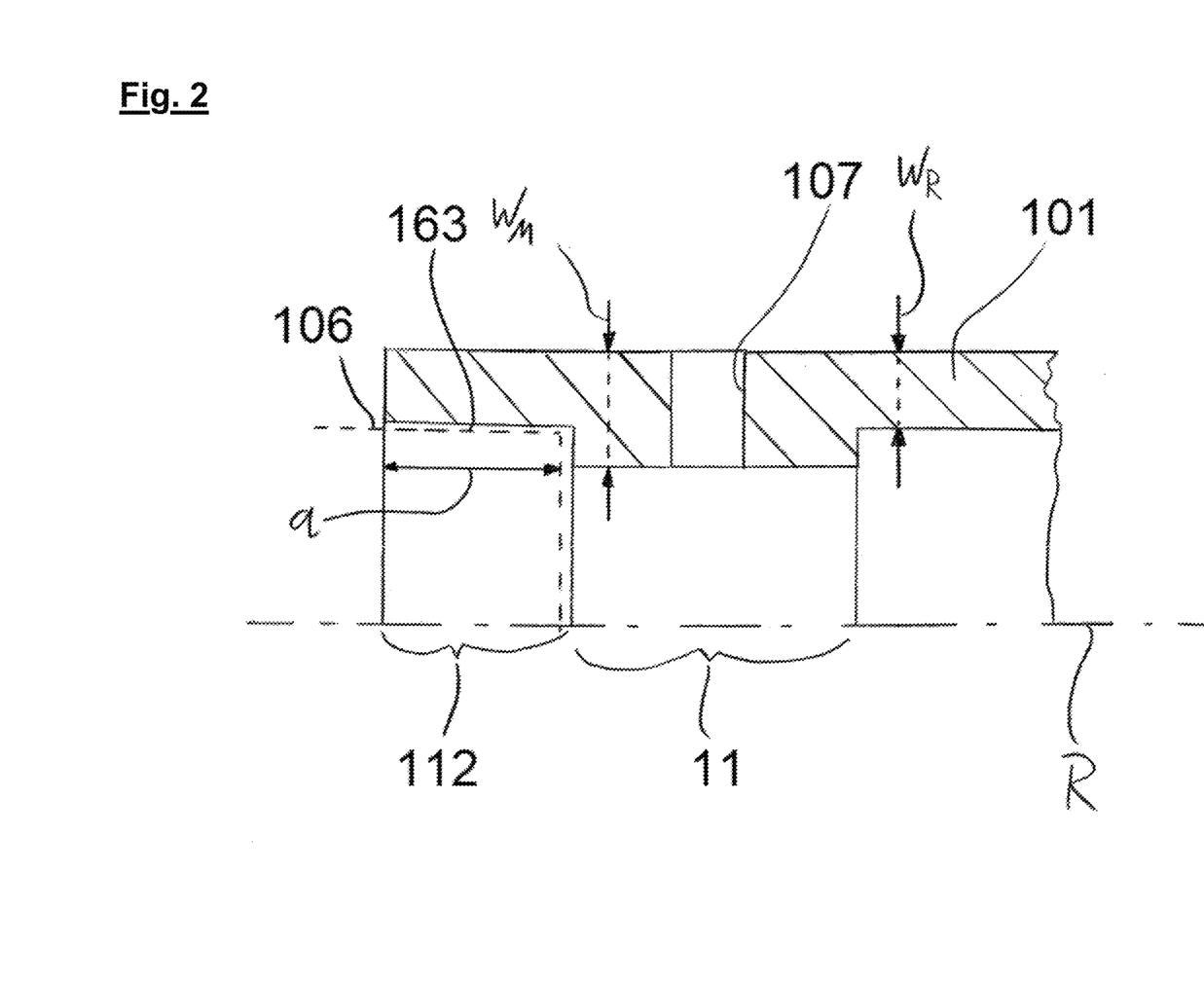
FIG. 2 a partially cutaway view of a further preferred embodiment of the axle unit according to the invention.

FIG. 2 shows a detail view of the tube unit 101, wherein this has a material reinforcement 11 on the left side of a first joining region 112 and adjacent thereto, and a recess or bore 107 in the region of the material reinforcement 11. Furthermore, the first wall thickness $w_M$ is marked in the region of the material reinforcement 11, which extends substantially transversely or preferably perpendicularly to the tube axis R. The first wall thickness $w_M$ is greater than the mean wall thickness $w_R$ of the tube unit 101 in the regions lying on the right in the figure, which are not shown completely. Furthermore, it can be seen that the stub axle 106 may be pushed with its stub joining region 163 into the first joining region 112, wherein an overlap with an overlap length a is formed.

Figure 3A:
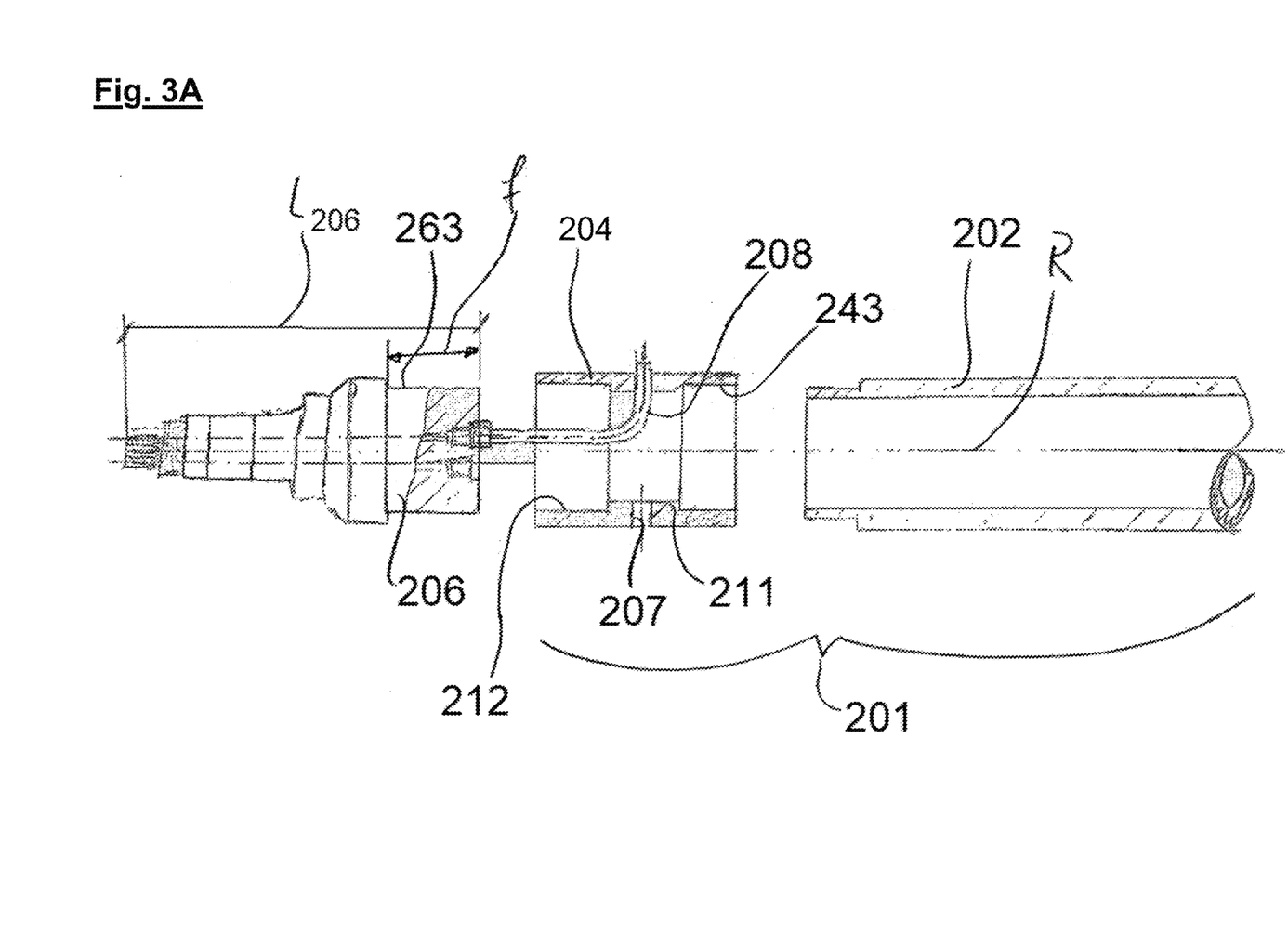
FIG. 3A-3C the steps of a preferred variant of the method according to the invention for production of an axle unit.

FIG. 3A shows the preferably first step of the production method for production of an axle unit, wherein a stub axle 206 and a tube unit 201 are provided and wherein a line element 208 is secured to the stub axle 206 within the channel 262 having a connecting portion 266 and guided into the tube unit 201 through the recess or bore 207 in the region of material reinforcement 211. In the present preferred example, the tube unit 201 consists of an intermediate element 204 and an axle tube 202, wherein firstly the intermediate element 204 is secured to the stub axle 206. On its left side, the intermediate piece 204 has a first joining region 212 in which the stub axle 206 is inserted with its stub joining region 263. The stub joining region has a joint length f which is substantially equal to the extension of the first joining region 212 along the tube axis R.

Figure 3B:
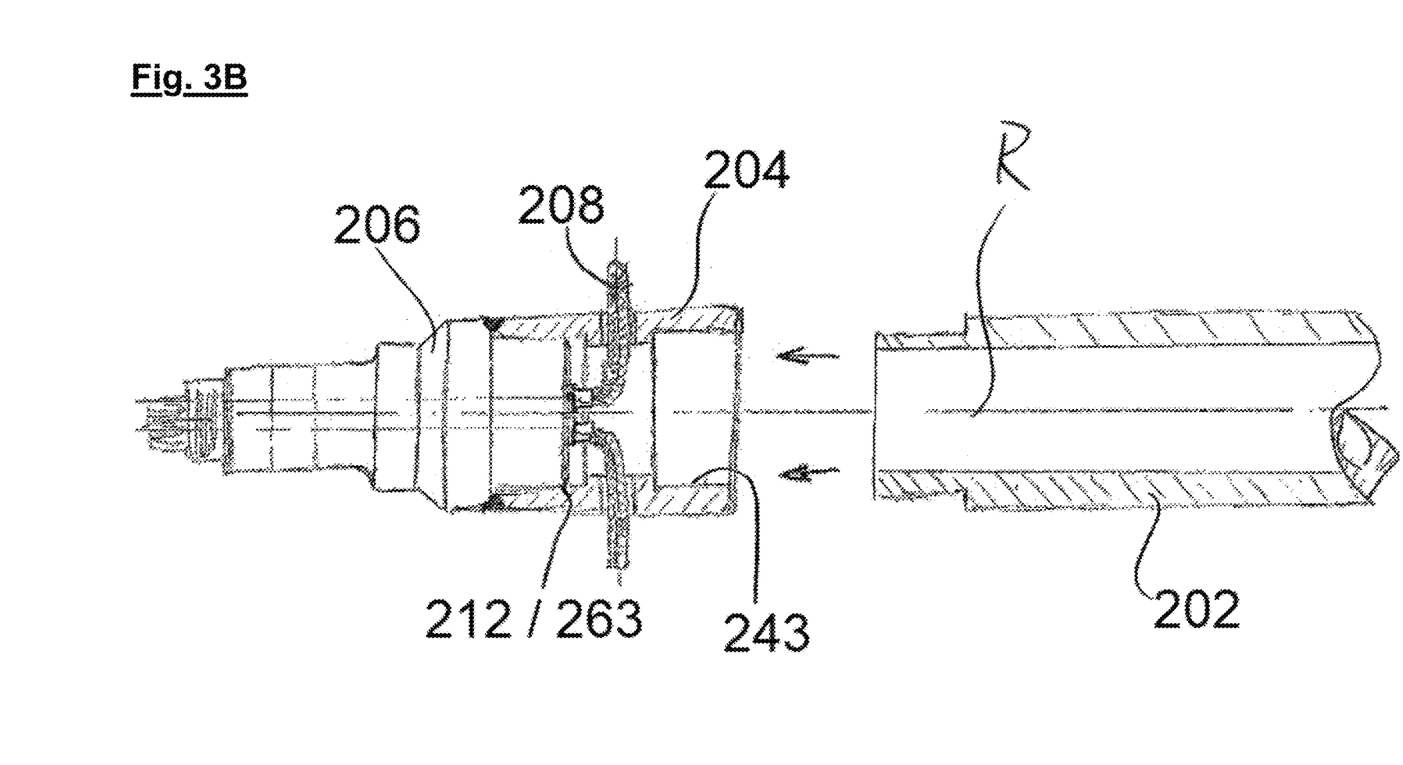

FIG. 3B shows the next method step of the preferred method for production of an axle unit, wherein the intermediate element 204 has been secured to the stub axle 206 by means of a weld connection. The axle tube 202 is inserted in a second joining region 243 of the intermediate element 204.

Figure 3C:
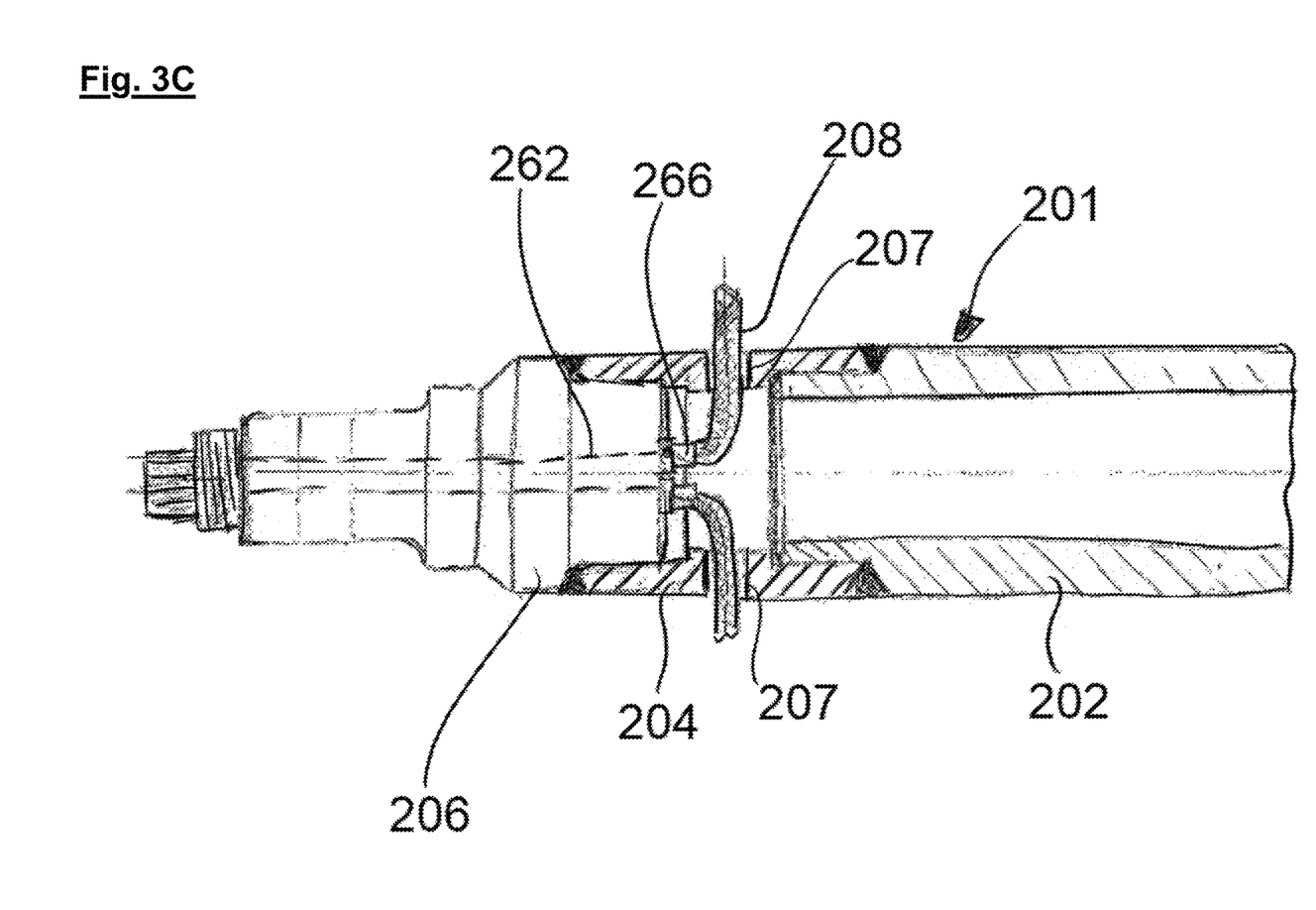

FIG. 3C shows the preferred embodiment of the axle unit according to the invention after completion of the last method step of the preferred method for production of the axle unit. Finally, the axle tube has been secured to the intermediate element 204 by means of a weld connection.

LIST OF REFERENCE NUMERALS 1, 101, 201 Tube unit
202 Axle tube
204 Intermediate element
6, 106, 206 Stub axle
7, 107, 207 Recess
8, 208 Line element
9 Gap
11, 211 Material reinforcement
12, 112, 212 First joining region
243 Second joining region
62, 262 Channel
63, 163, 263 Stub joining region
66, 266 Connecting portion
a Overlap length
f Joint length
k Tube length
$l_6$, $l_{206}$ Stub length
R Tube axis
S Stub axis

The invention claimed is:

1. An axle unit, comprising:
a stub axle; and
a tube unit;
wherein the stub axle at least in regions is configured rotationally symmetrically about a stub axis and has a channel which extends substantially parallel to the stub axis;
wherein the tube unit comprises a hollow body and extends substantially along a tube axis;
wherein the tube unit has a recess running transversely to the tube axis;
wherein a line element is configured to be brought into fluid-tight connection with the channel and passed through the recess of the tube unit;
wherein the line element includes a hydraulic line;
wherein the tube unit has a first joining region which is configured to connect to the stub axle;
wherein the first joining region forms an overlap with a stub joining region longitudinally along the stub joining axle;
wherein the overlap has an overlap length and the stub axle has a stub length, and wherein a ratio between the overlap length to the stub length is from 0.05 to 0.4; and
wherein the tube unit comprises an axle tube and an intermediate element, wherein the recess and a first joining region are located on the intermediate element, and wherein the intermediate element has a second joining region configured to secure to the axle tube.

2. The axle unit as claimed in claim 1, wherein the stub length extends along the stub axis, wherein the tube unit has a tube length along the tube axis, and wherein the ratio of the stub length to the tube length is from 0.1 to 1.2.

3. The axle unit as claimed in claim 2, wherein the ratio of the stub length to the tube length is 0.2 to 1.

4. The axle unit as claimed in claim 3, wherein the ratio of the stub length to the tube length is approximately 0.4 to approximately 0.7.

5. The axle unit as claimed in claim 2, wherein the ratio of the overlap length to the stub length is from 0.1 to 0.3.

6. The axle unit as claimed in claim 5, wherein the ratio of the overlap length to the stub length is from approximately 0.15 to approximately 0.20.

7. The axle unit as claimed in claim 5, wherein a gap is located in the region of the overlap of the first joining region to the stub joining region, wherein the gap is configured for introduction of an adhesive.

8. The axle unit as claimed in claim 1, wherein the first joining region is configured to be substance-bonded to the stub axle.

9. The axle unit as claimed in claim 1, wherein the stub axle has a connecting portion with an engagement arrangement configured to allow a fluid-tight connection between the line element and the channel.

10. The axle unit as claimed in claim 1, wherein the tube unit includes a material reinforcement in the region of the recess, wherein the material reinforcement has a first wall thickness, and wherein a ratio between the first wall and a mean tube wall thickness is from 1.05 to 3.

11. The axle unit as claimed in claim 10, wherein the ratio of the first wall thickness to the mean tube wall thickness is 1.3 to 2.6.

12. The axle unit as claimed in claim 11, wherein the ratio of the first wall thickness to the mean tube wall thickness is approximately 1.5 to approximately 1.8.

13. The axle unit as claimed in claim 1, wherein the channel is one of a plurality of channels, wherein the recess is one of a plurality of recesses, and wherein the plurality of channels includes at least two channels and the plurality of recesses includes at least two recesses.

14. The axle unit as claimed in claim 1, wherein the stub axle is one of two stub axles configured to be secured to each side of the tube unit.

* * * * *